(12) United States Patent
Horn

(10) Patent No.: US 6,522,400 B1
(45) Date of Patent: Feb. 18, 2003

(54) PORTABLE FRONT WHEEL ALIGNMENT APPARATUS AND METHOD

(76) Inventor: Edward Horn, 6001 Charter Oak La. SE., Cedar Rapids, IA (US) 52403

( * ) Notice: Subject to any disclaimer, the term of this patent is extended or adjusted under 35 U.S.C. 154(b) by 0 days.

(21) Appl. No.: 09/883,566

(22) Filed: Jun. 18, 2001

(51) Int. Cl.[7] .............................................. G01B 11/26
(52) U.S. Cl. .................. 356/155; 356/139.09; 356/138
(58) Field of Search ........................... 356/139.09, 138, 356/155; 33/288, 600

(56) References Cited

U.S. PATENT DOCUMENTS

| | | | | |
|---|---|---|---|---|
| 4,455,759 | A | * | 6/1984 | Coetsier .................. 33/203.14 |
| 4,594,789 | A | * | 6/1986 | Marino et al. ........... 33/203.18 |
| 5,018,853 | A | * | 5/1991 | Hechel et al. ................. 33/288 |
| 5,335,420 | A | * | 8/1994 | Kling et al. .............. 33/203.18 |

* cited by examiner

*Primary Examiner*—Frank G. Font
*Assistant Examiner*—Roy M. Punnoose
(74) *Attorney, Agent, or Firm*—Allan L. Harms

(57) ABSTRACT

Apparatus to align the front wheels of a go-cart or other wheeled vehicle on which front wheel toe-in is adjustable. A laser disposed adjacent a horizontally disposed scale is selectively detachably mounted to the rear axle of the go-cart at one of the sides of the go-cart and a mirror member is selectively detachably mounted to the front spindle on the same side of the go-cart. The laser is oriented to emit a laser beam at a perpendicular to the rear axle and onto the mirror of the mirror element which reflects the laser beam back toward the scale. Toe-in of one front wheel of the vehicle may be adjusted precisely by viewing the separation of the emitted laser beam and the impingement of the reflected beam on the scale. The apparatus may then be mounted on the opposite side of the vehicle and the other front wheel adjusted. Alternate mounting means are described which permit the laser and scale and the mirror member to be mounted to the go-cart without removing its wheels and without suspending the vehicle.

21 Claims, 5 Drawing Sheets

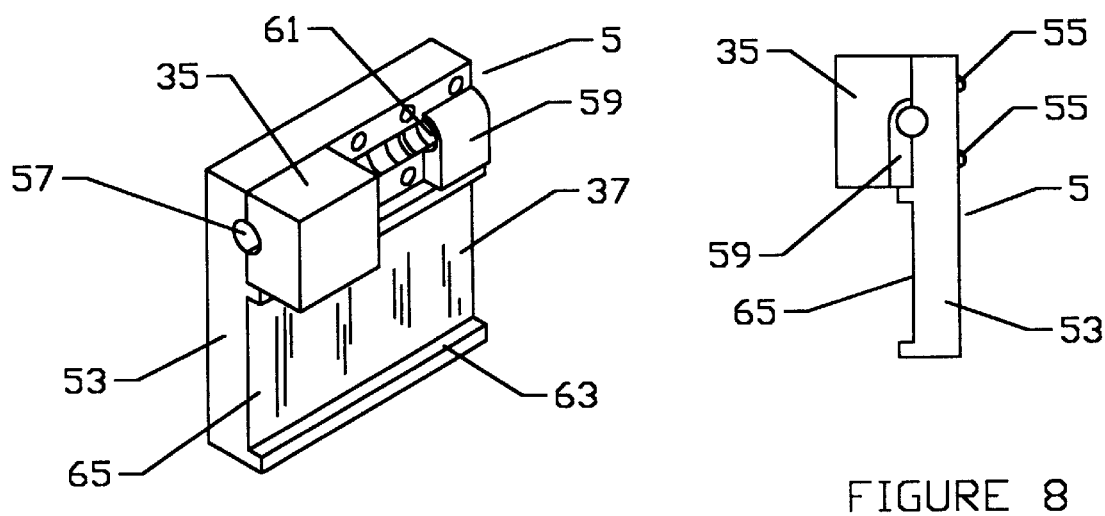
FIGURE 7
FIGURE 8
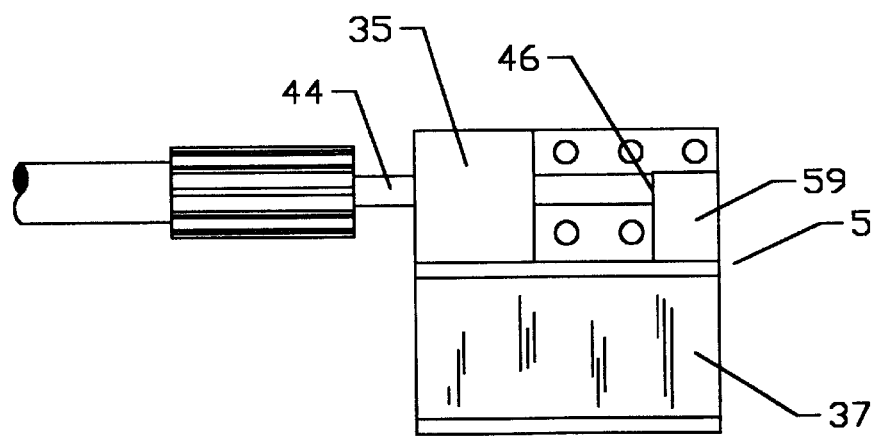
FIGURE 9

PORTABLE FRONT WHEEL ALIGNMENT APPARATUS AND METHOD

STATEMENT REGARDING FEDERALLY SPONSORED RESEARCH OR DEVELOPMENT

Not Applicable.

BACKGROUND OF THE INVENTION

In the racing of motor vehicles, in particular, go-carts, midget racers, stock cars and other racing vehicles, it is necessary to frequently adjust the front wheel alignment relative to the rear wheels of the vehicle. In present practice with go-cart racing, this is done by raising and supporting the vehicle, removing the wheels on one side of the vehicle, and temporarily mounting a transverse bar to each of the wheel hubs of the front and rear axles. The steering is centered and locked in place and the steering tie rods may then be adjusted to vary toe-in or toe-out of the front wheels as desired by visually aligning the bars mounted to the wheel hubs. Once one side's alignment is set, the process is repeated on the opposing side of the vehicle.

Because adjustments of toe-in are preferably made at the track, with the vehicle body in place on the vehicle frame, it becomes very difficult to accurately align the bars mounted to the wheel hubs because body molding interferes with the visual measurements. Additionally, two persons are needed to perform the alignment task, with one making measurements at each wheel hub. In addition, the procedure can only be performed with the vehicle frame suspended and the wheels removed. This method to adjust an important performance characteristic of a vehicle, especially a racing vehicle, is quite cumbersome and labor intensive.

SUMMARY OF THE INVENTION

The present invention provides an apparatus and method to accurately adjust front wheel alignment of a motor vehicle, especially a small racing vehicle such as a go-cart. The apparatus of the present invention may be operated by one person and it allows the alignment adjustments to be performed either with the vehicle resting on its tires or suspended with its wheels removed. Because the apparatus is fully portable and lightweight, adjustments to toe-in may be performed immediately before a race as well as during a race if conditions warrant further toe-in adjustment.

The invention includes a mirror which is selectively mountable to the front wheel spindle of the motor vehicle with the mirror reflective face parallel to the axis of the spindle. The mirror is provided with mounting hardware which allows its mounting to the spindle either with the wheel removed or by use of an extender such that the mirror may be attached to the spindle without removal of the front wheel. A small, lightweight laser, preferably battery powered, is selectively mountable to the rear axle by mounting hardware which causes the axis of the laser's output beam to emanate at a perpendicular to the axis of the rear axle toward the mirror mounted to the front spindle. A linear scale is mounted to the rear axle, preferably by mounting it to the body of the laser or to the laser mounting hardware, the scale being stationed substantially in parallel to the axis of the rear axle and aligned generally with the output from the laser. The beam from the laser is directed toward the mirror such that the beam will be reflected onto the scale. By adjusting the steering tie rod while the laser beam is reflected onto the scale, a precise toe-in may be established. The laser and scale may be mounted to the rear axle either directly when the wheels of the motor vehicle are removed or by use of an axle extension member or other mounting hardware which may be employed to effectively lengthen use of the invention when the wheels remain on the vehicle. With this apparatus, the toe-in of the front wheels may be set accurately even when the driver is present in the vehicle. The adjustment can be made during a race in a short time by one worker without requiring the driver to exit the vehicle or without removal of the vehicle's wheels.

The present invention is currently manufactured under the trademark "ACCUTOE PRO" by Horn Racing Products, L.L.C. of Cedar Rapids, Iowa.

It is accordingly an object of the invention to provide a portable front wheel alignment apparatus for a vehicle which provides increased toe-in adjustment accuracy.

It is a further object of the invention to provide a wheel alignment apparatus which may be utilized without removal of the wheels of a motor vehicle.

It is yet another object of the invention to provide a toe-in adjustment apparatus for motor vehicles which may be employed with a wide variety of four-wheel motor vehicles which feature a front wheel toe-in adjustment which affects vehicle performance on the road or race track.

It is also an object of the invention to provide a fully portable, easily used, wheel alignment apparatus for racing go-carts which can be employed to accurately adjust front wheel alignment with the go-cart resting on its wheels.

It is a further object of the invention to provide a method to accurately adjust front wheel toe-in on a vehicle resting on its wheels.

These and other objects of the invention will become apparent from examination of the description and claims which follow.

BRIEF DESCRIPTION OF THE SEVERAL VIEWS OF THE DRAWING(S)

FIG. 7 is a perspective of the mirror member of the invention.

FIG. 8 is a end plan view of the mirror member of FIG. 7.

FIG. 9 is a front elevation of the mirror member of the invention shown mounted to a spindle shaft.

DETAILED DESCRIPTION OF THE INVENTION

Figure 1:
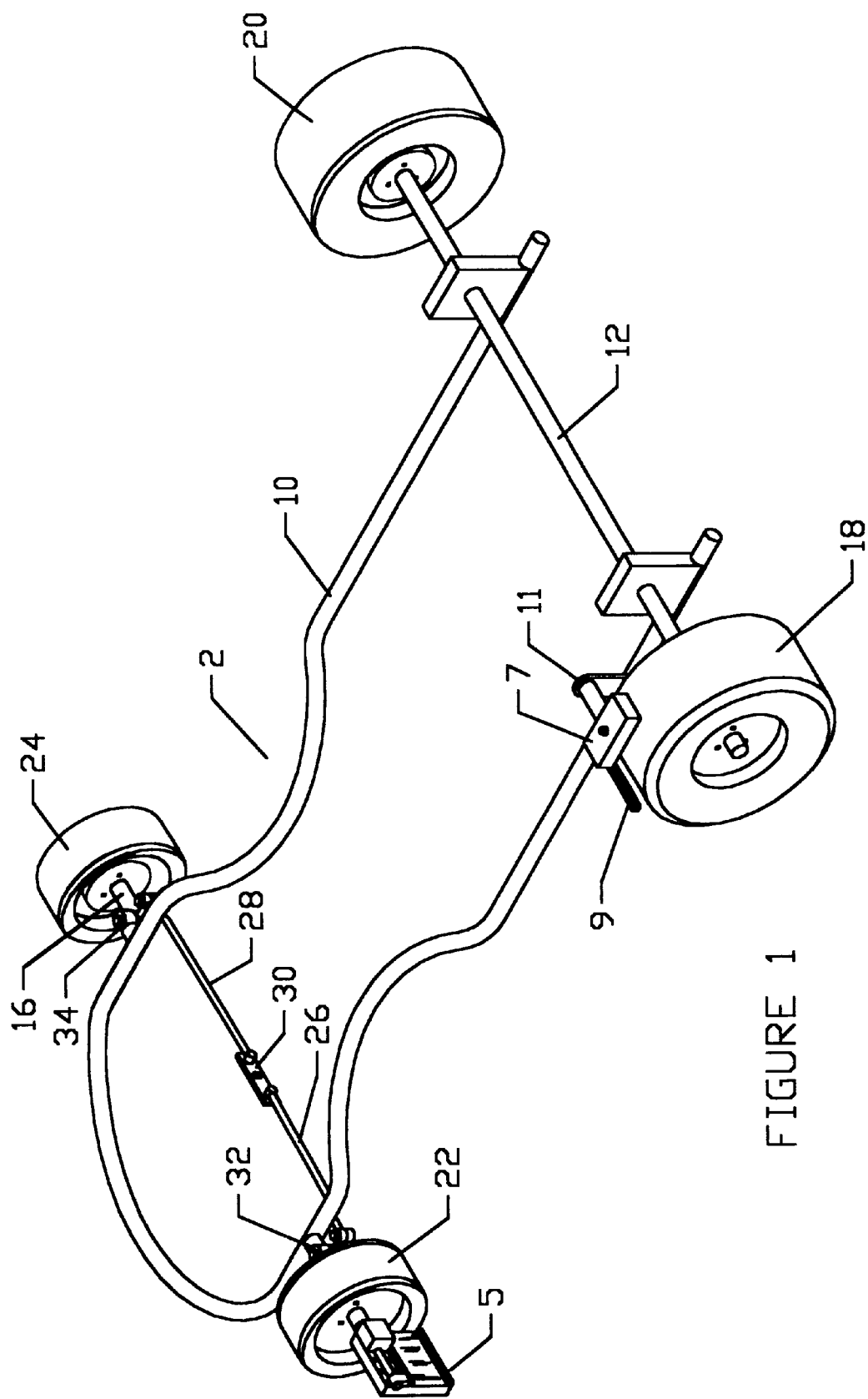
FIG. 1 is a rear left perspective representation of a go-cart or other four wheeled vehicle to which the invention has been temporarily mounted.

The alignment tool invention is shown in FIG. 1 in use on a go-cart 2 represented schematically. The go-cart 2 includes a generally rectangular frame 10 on which are supported a rear axle 12, a left front spindle and a right front spindle 16. Rear wheels 18, 20 are mounted to opposing ends of rear axle 12. Left front wheel 22 is mounted a left front spindle extending outward from left steering knuckle 32. Front wheel 24 is mounted at the free end of right front spindle 16. Left tie rod 26 and right tie rod 28 interconnect steering gear 30 with steering knuckles 32, 34 respectively. Tie rods 26, 28 are each adjustable in length, providing means to adjust toe-in of front wheels 22, 24.

Mirror member 5 of the invention is mounted to left front wheel 22 by attachment to the distal end of the left spindle extension of left front wheel 22. A mounting bracket 11 is detachably fixed to rear axle 12 adjacent to left rear wheel 18. Mounting bracket 11 supports laser 7 and scale 9 thereon such that laser 7 and scale 9 overlie left rear wheel 18.

Figure 2:
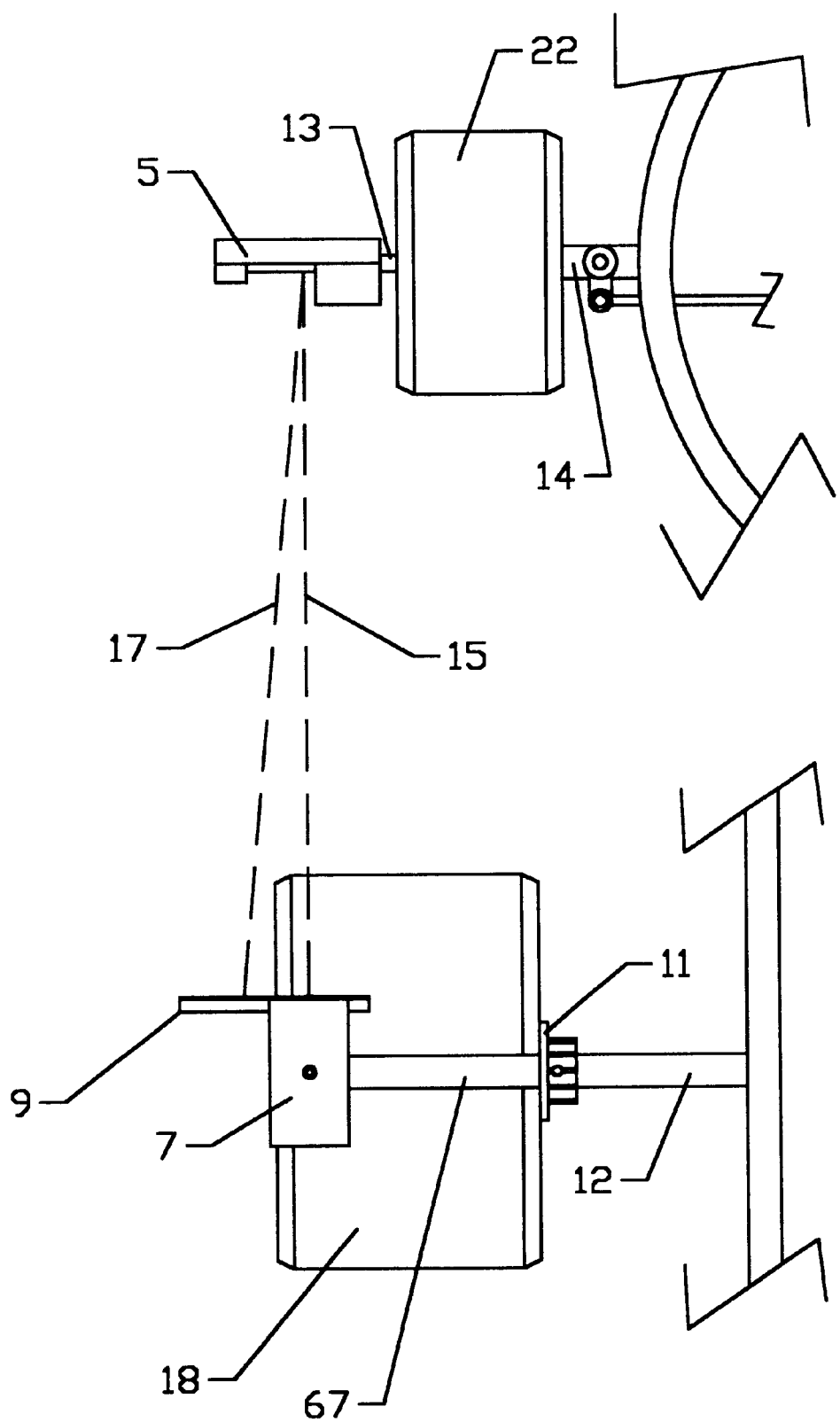
FIG. 2 is a top view of the front spindle and rear axle on the left hand side of a four-wheel vehicle to which the invention is mounted, with parts of the frame and the body of the vehicle omitted.

Referring now to FIG. 2, it can be seen that mirror member 5 is fixed to front left wheel 22 exteriorly thereof and axially aligned with left spindle 14. Mirror member 5 may be mounted to left spindle 14 by use of axle extender 13 which may be coaxially fixed to left spindle 14 at the hub of front wheel 22. Mirror member 5 may alternatively be mounted to left spindle 14 by other bracketry so long as mirror member 5 is aligned with the axis of left spindle 14 and will intersect with a line extending perpendicularly from rear axle 12 or from an extension thereof. Obviously, mirror member 5 reflects emitted laser beam 15.

The laser 7 of the invention is mounted to rear axle 12 such that emitted laser beam 15 from laser 7 is directed forward of rear wheel 18 at a perpendicular to rear axle 12. Laser 7 may be supported on mounting bracket 11 which comprises standoff 67 such that laser 7 is stationed above or forward of rear wheel 18 so emitted laser beam 15 may unobstructively strike mirror member 5 and be reflected thereby. Standoff bar 67 is of suitable length to position laser 7 to the rear of mirror member 5 while permitting emitted laser beam 15 to be directed on a line a perpendicular to the axis of rear axle 12. Reflected laser beam 17 is reflected back toward rear wheel 18 and may strike scale 9 along the length thereof. Mirror member 5 must intersect the axis of emitted laser beam 15 such that reflected laser beam 17 will strike scale 9 which is advantageously mounted immediately adjacent laser 7 including in a position relative to laser 7 such that emitted laser beam 15 is in vertical alignment along the length of scale 9.

Figure 3:
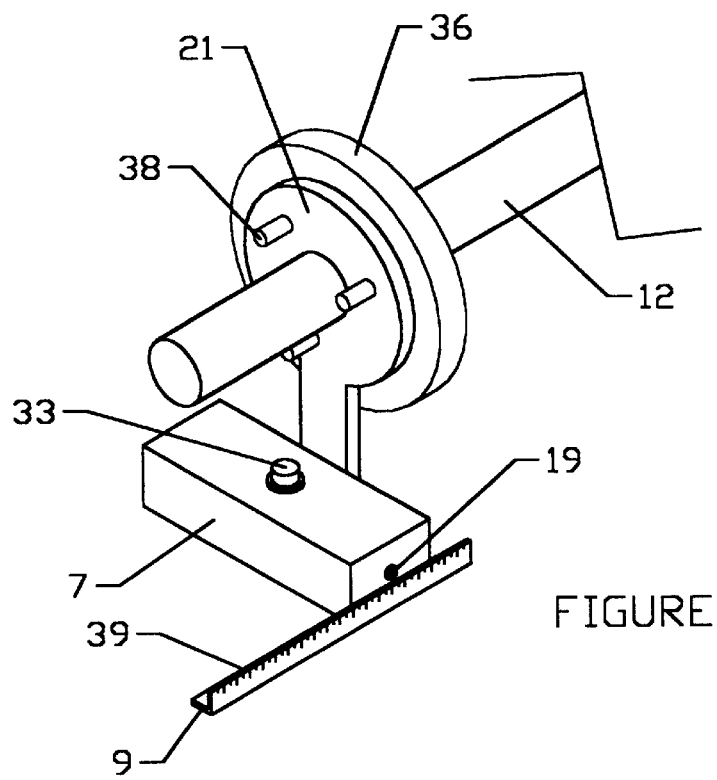
FIG. 3 is a perspective view of the laser and scale members of a preferred embodiment of the invention shown mounted to a wheel hub of a rear axle, the rear axle being substantially cut away.
Figure 4:
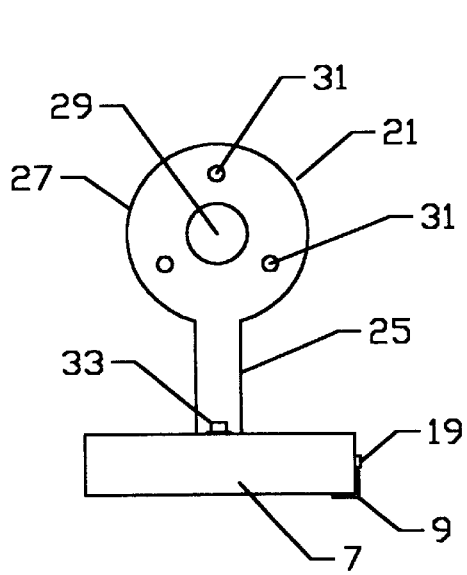
FIG. 4 is a front elevation of the laser, scale, and ring bracket of a preferred embodiment of the invention.
Figure 5:
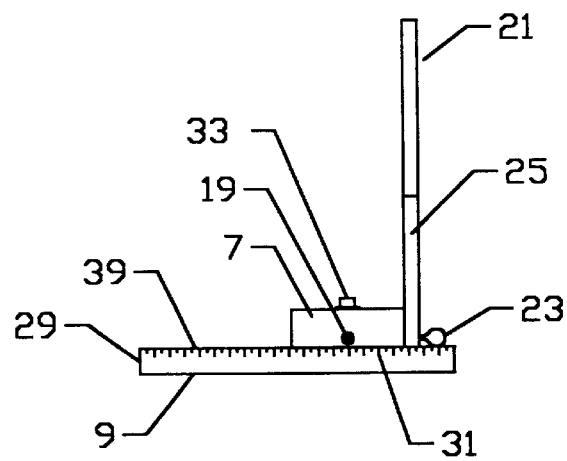
FIG. 5 is a plan view of the laser, scale, and ring bracket of FIG. 4.

Referring now to FIGS. 3–5, the laser 7 and scale 9 of a preferred embodiment of the invention are illustrated in greater detail. Laser 7 and scale 9 are fixed together with scale 9 fixed to laser 7 such that the optical port 19 of laser 7 vertically registers with some portion of the scale 9. In FIG. 3, scale 9 is fixed to laser 7 such that a laser beam emanating from optical port 19 overlies scale 9. Laser 7 is detachably fastened to ring bracket 21 by, for instance, thumbscrew 23 which retains laser 7 to arm 25 of ring bracket 21. Arm 25 radially extends from annular element 27 of ring bracket 21. Annular element 27 comprises axle opening 29 and bolt holes 31 which may be located to receive lugs 38 which extend outwardly from the wheel hub 36 of the rear axle 12, thereby allowing ring bracket 21 to conveniently be received on rear axle 12 and be temporarily fastened to wheel hub 36.

Scale 9 is preferably mounted immediately adjacent laser 7 such that output port 19 of laser 7 is near edge 39 of scale 9 but output port 19 is not obstructed by scale 9. Scale 9 is preferably elongate and linear and includes graduations 31 thereon which are laterally spaced. In practice, it is found that spacings of approximately one sixteenth of an inch between graduations 31 provides a useful gauge for adjustment of front wheel toe-in.

Laser 7 also comprises activation switch 33 which allows the user to selectively activate laser 7 causing a laser beam to emanate from output port 19. It is to be understood that laser 7 and scale 9 may be oriented such that scale 9 overlies optical port 19 and that various configurations of brackets may be employed to allow laser 7 to be oriented such that a beam emanating therefrom is perpendicular to the axis of the rear axle of the vehicle to be adjusted. The ring bracket 21 of FIGS. 3–5 permits mounting of the laser 7 and scale 9 to a rear axle 12 when the rear wheels of the vehicle have been removed. However, the laser 7 and attached scale 9 may be employed on a vehicle with the rear wheels thereof remaining mounted on the rear axle, as shown in FIG. 6.

Figure 6:
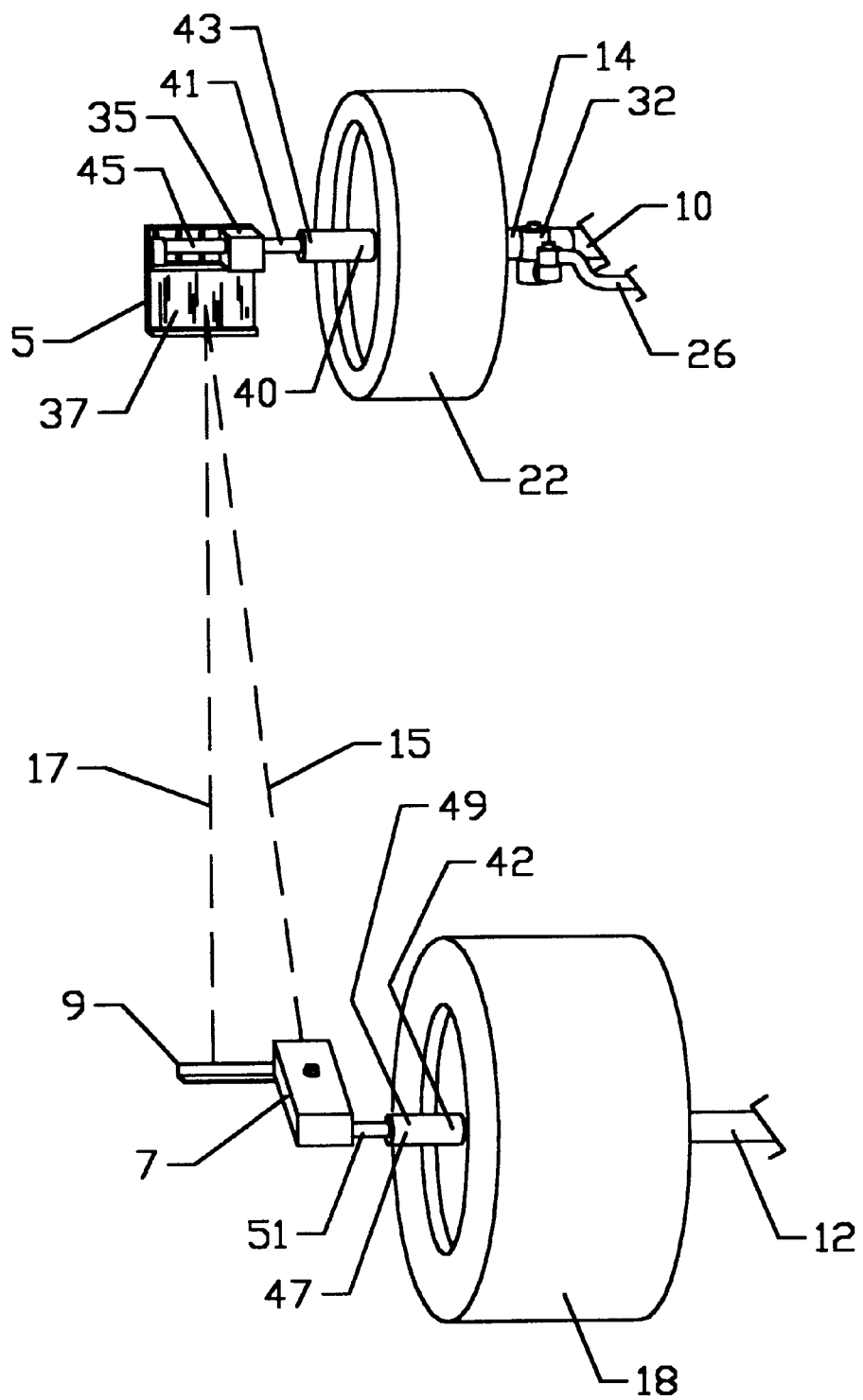
FIG. 6 is a perspective of a preferred embodiment of the invention shown mounted to a vehicle, parts of the vehicle being omitted.

In FIG. 6 the invention is illustrated in use on a go-cart or other motor vehicle with left front wheel 22 and left rear wheel 18 mounted to left spindle 14 and rear axle 12 respectively. In the preferred embodiment of FIG. 6, spindle extender 41 is mounted at its enlarged end 43 at the hub 40 of front wheel 22. Enlarged end 43 may include a threaded axial bore which may receive the distal end of spindle 14 as it extends through hub 40 of front wheel 22. Spindle extender 41 comprises a reduced diameter end 45 which extends from enlarged end 43, the diameter of reduced end 45 being preferably approximately the diameter of spindle 14 whereby mirror member 5 may be mounted equally well to spindle 14 when front wheel 22 is removed or to the reduced diameter end 45 of spindle extender 41. Reduced diameter end 45 of spindle extender 41 is received in bracket 35 of mirror member 5.

Attached at hub 42 of rear wheel 18 is rear axle extender 47 which is detachably mounted coaxially with rear axle 12. Rear axle extender 47 is provided with enlargement 49 in which a threaded longitudinal coaxial bore is made such that rear axle extender 47 may receive the outboard end of rear axle 12. Extending coaxially from enlargement 49 is shaft 51 of axle extender 47 which may be sized at the same diameter as the rear axle 12. Additionally, rear axle extender 47 may be interchangeable with spindle extender 41 and hence identical therewith. Laser 7 may be abutted to the end of rear axle extender 47 or detachably mounted thereto by alternate arrangements provided that the axis of emitted laser beam 15 generated by laser 7 is perpendicular to the axis of rear axle 12. Scale 9 may be detachably mounted to rear axle extender 47 but is preferably mounted to laser 7 such that the longitudinal axis of scale 9 is perpendicular to the axis of emitted laser beam 15 and hence the longitudinal axis of scale 9 is parallel with the axis of rear axle 12. Mirror member 5 includes a mirror or reflecting surface 37 on which emitted laser beam 15 from laser 7 may impinge and be reflected toward scale 9 as reflected laser beam 17.

Referring now to FIGS. 7–9, the mirror member 5 is shown to comprise a base 53 to which is mounted a reflecting surface 37 which may be a typical mirror 65. A bracket 35 is adjustable upon base 53 such that a spindle shaft 44 may be received in shaft opening 57 and be clamped therein between bracket 35 and base 53 of mirror member 5. Base 53 also comprises a receiving block 59 removably fastened thereon which includes a guide opening 61 into which the leading end 46 of a spindle shaft 44 may be received before bracket 35 is tightened against base 53 such as by use of adjusting screws 55. A shelf 63 may be formed on base 53 to provide support to a mirror 65 serving as reflecting surface 37. It may be seen in FIGS. 7, 8 that receiving block 59 and bracket 35 may be interchanged so that mirror member 5 may be used on either front wheel of a vehicle, both receiving block 59 and bracket 35 being retained selectively to base 53 of mirror member 5 by retention screws 55.

It should be understood the laser 7 with attached scale 9 may be mounted directly so rear axle 12 when rear wheel 18 is removed, after the vehicle 2 is suspended above the ground. Such mounting may be made by use of the ring bracket 21 illustrated in FIG. 3 or by other bracket arrangements, or by end mounting to a rear axle 47 as shown in FIG. 6. Also, mirror member 5 may be mounted directly to left spindle 14, or if necessary, it may be mounted to spindle extender 41 which may be coaxially mounted to left spindle 14. Obviously, reflecting surface 37 of mirror member 5 must be oriented substantially perpendicularly to the direction of travel of front wheel 22 when it is properly mounted to left spindle 14.

It is to be understood that various bracketry and other attachment apparatus may be fashioned to allow attachment of the laser and scale to the rear axle of a motor vehicle and the mirror member to a front spindle, without departing from this disclosure, all such variants being contemplated in this disclosure; provided that the laser beam 15 from the laser 7 must be oriented at a perpendicular to the axis of the rear axle 12, that the reflecting surface 37 of the mirror member 5 must be parallel with the axis of the front spindle, and the laser beam 17 reflected by the reflecting surface 37 must strike the scale 9 along its length.

In operation, a user may attach the laser 7 and scale 9 to a rear axle extender which is attached to the rear axle 12 of a go-cart or other vehicle which has stopped for servicing or adjustment while leaving the tires, wheels and all body parts on the vehicle. Similarly, the mirror member 5 may be attached to a front spindle by use of a spindle extender. Once the steering gear has been locked in a straight-ahead position, the user may energize the laser 7 and note the location on the scale 9 at which the laser beam is reflected and by adjustment of the steering tie rod, adjust the front wheel toe-in to the desired setting as determined by observing the horizontal separation of the reflected laser beam 17 on the scale 9 relative to the location of the emitted laser beam 15. The invention may then be removed and attached to the rear axle and spindle on the opposite side of the vehicle. If the wheels have been removed, the mirror member 5 may be mounted to a front spindle and the laser 7 and scale 9 may be mounted to the rear axle and the identical adjustment made. The invention therefore is able to adjust toe-in of front steering with the vehicle resting on its wheels or with the wheels removed.

Having described the invention, I claim:

1. Apparatus for determining alignment of a front wheel of a vehicle comprises
    a mirror member detachably mounted to the front wheel on a first side of the vehicle,
    said mirror member having a reflecting surface oriented substantially perpendicularly to the direction of travel of said front wheel,
    a laser emitting a beam of laser light,
    the laser detachably mounted to a rear wheel of the vehicle,
    the rear wheel mounted on the first side of said vehicle,
    said rear wheel rotatable about an axis,
    said laser directing the beam of laser light substantially perpendicularly to the axis of said rear wheel,
    said laser beam directed toward said reflecting surface of said mirror,
    an elongate gauge in fixed position relative to said beam of laser light,
    whereby said beam of laser light reflects from said reflecting surface of said mirror member and strikes said gauge.

2. The apparatus of claim 1 wherein
    said gauge has a longitudinal axis disposed substantially perpendicularly to said laser beam,
    the axis of said gauge substantially parallel to the axis of said rear wheel.

3. The apparatus of claim 2 wherein
    a portion of said gauge is vertically aligned with said laser beam.

4. The apparatus of claim 3 wherein
    said laser is mounted to a rear axle extender,
    the real axle extender axially aligned with said rear axle.

5. The apparatus of claim 3 wherein
    said laser is mounted to a bar spaced apart from said rear axle,
    said bar supported on an offset bracket detachably fixed to said rear axle,
    the bar having an axis parallel to said rear axle.

6. The apparatus of claim 1 wherein
    said gauge is fixed to said laser,
    said gauge having markings thereon delineating lateral positions therealong.

7. The apparatus of claim 4 wherein
    an extension member is mounted to said front wheel and axially aligned thereto,
    said mirror mounted to said extension member.

8. The apparatus of claim 7 wherein
    said mirror member comprises a base and a bracket selectively mountable thereto,
    said reflecting surface disposed on said base,
    the bracket retaining said extension member to said mirror member.

9. The apparatus of claim 8 wherein
    said gauge is fixed to said laser,
    said gauge having markings thereon delineating lateral positions therealong.

10. Apparatus to measure convergence of a front wheel spindle of a vehicle toward a rear axle of the vehicle comprises
    a mirror having a reflecting surface,
    the mirror detachably mounted to the front wheel spindle,
    the reflecting surface axially parallel to said front wheel spindle,
    a laser detachably mounted to the rear axle,
    the laser emitting a laser beam toward said front wheel spindle,
    the laser beam directed at a perpendicular to said rear axle,
    the laser beam striking said reflecting surface of said mirror and being reflected thereby,
    an elongate scale member having incremental markings therealong,
    the scale disposed substantially perpendicularly to said laser beam,
    said laser beam reflecting from said reflecting surface striking said scale,
    whereby said front wheel spindle may be adjusted precisely by reference to the horizontal separation of said emitted laser beam and said reflected beam at said scale.

11. The apparatus of claim 10 wherein a spindle extender is selectively mounted to said front spindle and is coaxial therewith, said mirror mounted to said spindle extender.

12. The apparatus of claim 11 wherein a rear axle extender is selectively mounted to said rear wheel and is coaxial therewith, said laser mounted to said rear axle extender.

13. The apparatus of claim 10 wherein said scale member mounted to said laser, a portion of said scale vertically aligned with said laser beam.

14. The apparatus of claim 13 wherein said vehicle is a racing go-cart, said go-cart having a rear axle hub coaxial with said rear axle, a ring bracket selectively mounted to said rear axle hub, the ring bracket having an arm depending radially therefrom, said laser mounted to said arm of said ring bracket, said scale spaced apart and parallel to said rear axle.

15. The apparatus of claim 14 wherein said mirror comprises a bracket and a base, said bracket adjustably mountable to said base, a spindle extender coaxially mounted to said front spindle, said mirror selectively mounted to said spindle extender, said bracket retaining said axle extender to said base of said mirror.

16. A method to determine toe-in of a front wheel of a vehicle having front wheel spindles and a rear axle comprising the steps of temporarily mounting a reflecting surface to the front wheel spindle on a first side of the vehicle, the reflecting surface substantially parallel to said front wheel spindle, temporarily mounting a laser to the rear axle of said vehicle on the first side of said vehicle, temporarily mounting an elongate scale to said rear axle in parallel thereto, causing the laser to emit a laser beam perpendicular to said rear axle, reflecting said emitted laser beam from said reflecting surface, adjusting said front spindle to cause said laser beam to reflect onto said scale at a predetermined location.

17. The method of claim 16 wherein the scale is oriented substantially parallel to said rear axle, a part of the scale vertically aligned with the emitted laser beam.

18. The method of claim 17 wherein said scale is mounted to said laser.

19. The method of claim 18 further comprising the steps of suspending said vehicle above the ground, said vehicle having wheels mounted thereto, removing the wheels from one side of said vehicle, temporarily mounting a spindle extender to said spindle on said one side of said vehicle, the spindle extender coaxial with said spindle, temporarily mounting a mirror to said spindle extender, the mirror having said reflecting surface thereon, mounting said scale to said laser, temporarily mounting a rear axle extension coaxially to said rear axle, mounting said laser to said real axle extension.

20. Apparatus to adjust toe-in of one of the front wheels of a racing go-cart having two front spindles and a single elongate rear axle, the invention comprising a mirror detachably mounted to a one of the two front spindles of the racing go-cart on a first side thereof, the go-cart having a first tie rod linked to the one of the two front axles, each of the rear axle and the two front spindles having a longitudinal axis, the mirror having a reflecting face substantially parallel to the longitudinal axis of the one of the two front spindles, a laser detachably mounted to the rear axle on the first side of the racing go-cart, the laser emitting an emitted laser beam in a direction substantially perpendicular to the longitudinal axis of the rear axle, the emitted laser beam striking the reflecting face of the mirror and being reflected therefrom as a reflected beam, an elongate scale detachably mounted to the rear axle on the first side of the racing go-cart, the elongate scale having an axis substantially parallel to the longitudinal axis of the rear axle, the reflected beam striking the elongate scale along its length, whereby the first tie rod may be adjusted to vary the toe-in of the one of the front wheels by varying the length of the first tie rod to vary the location at which the reflected beam strikes the elongate scale.

21. A method to adjust toe-in of a front wheel of a racing go-cart having two front spindles and a single elongate rear axle comprising the steps of detachably mounting a reflecting surface to a first of the front spindles of the racing go-cart on a first side of the racing go-cart, the first front spindle having a first tie rod connected thereto, the reflecting surface substantially parallel to the first front spindle, detachably mounting a laser to the rear axle on the first side of the racing go-cart, detachably mounting an elongate scale to the rear axle on the first side of the racing go-cart, the elongate scale substantially parallel to the rear axle, causing the laser to emit a laser beam substantially perpendicular to said rear axle and directed toward the reflecting surface, reflecting said emitted laser beam from said reflecting surface as a reflected beam, causing the reflected laser beam to strike the elongate scale at a preselected location therealong by adjusting the length of the first tie rod.

* * * * *

UNITED STATES PATENT AND TRADEMARK OFFICE
CERTIFICATE OF CORRECTION

PATENT NO.    : 6,522,400 B1
DATED         : February 18, 2003
INVENTOR(S)   : Edward Horn It is certified that error appears in the above-identified patent and that said Letters Patent is hereby corrected as shown below:

Column 6,
Line 16, delete "real" and substitute therefor -- rear --.

Column 8,
Line 6, delete "real" and substitute therefor -- rear --.

Signed and Sealed this

Fifteenth Day of April, 2003

JAMES E. ROGAN
*Director of the United States Patent and Trademark Office*